(12) United States Patent
Zhang (10) Patent No.: US 11,860,473 B2
(45) Date of Patent: Jan. 2, 2024

(54) DISPLAY PANEL AND DISPLAY DEVICE (71) Applicant: WUHAN CHINA STAR OPTOELECTRONICS TECHNOLOGY CO., LTD., Wuhan (CN)

(72) Inventor: Pengfei Zhang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 192 days.

(21) Appl. No.: 17/599,482

(22) PCT Filed: May 31, 2021

(86) PCT No.: PCT/CN2021/097519
§ 371 (c)(1),
(2) Date: Sep. 28, 2021

(87) PCT Pub. No.: WO2022/241836
PCT Pub. Date: Nov. 24, 2022

(65) Prior Publication Data
US 2023/0244103 A1 Aug. 3, 2023

(30) Foreign Application Priority Data
May 21, 2021 (CN) .......................... 202110559351.6

(51) Int. Cl.
*G02F 1/1335* (2006.01)
*G02F 1/1343* (2006.01)
(Continued)

(52) U.S. Cl.
CPC .... *G02F 1/133553* (2013.01); *G02F 1/13394* (2013.01); *G02F 1/13706* (2021.01);
(Continued)

(58) Field of Classification Search
CPC ......... G02F 1/133553; G02F 1/133514; G02F 1/133618; G02F 2201/08; G02F 1/133377;
(Continued)

(56) References Cited

U.S. PATENT DOCUMENTS

2001/0040659 A1 11/2001 Hanaoka et al.
2002/0105609 A1* 8/2002 Moon ............... G02F 1/133514
349/113
(Continued)

FOREIGN PATENT DOCUMENTS

| CN | 104749833 A | 7/2015 |
| CN | 106292119 A | 1/2017 |

(Continued)

*Primary Examiner* — Jia X Pan
(74) *Attorney, Agent, or Firm* — PV IP PC; Wei Te Chung; Zhigang Ma (57) ABSTRACT

The present application provides a display panel and a display device. The display panel includes a liquid crystal layer, a light adjustment layer, and a reflection layer. The liquid crystal layer includes a plurality of liquid crystal molecules. The light adjustment layer includes a plurality of light adjustment portions, and each of the light adjustment portions and a corresponding one of the liquid crystal molecules include a contact interface. The reflection layer is disposed on a side of the liquid crystal layer and the light adjustment layer away from a display side and corresponds to the light adjustment portions. An incident light is totally reflected at the contact interface or passes through the contact interface.

15 Claims, 6 Drawing Sheets

(51) Int. Cl.
   *G02F 1/137* (2006.01)
   *G02F 1/1339* (2006.01)
   *G02F 1/13357* (2006.01)

(52) U.S. Cl.
   CPC .... *G02F 1/13712* (2021.01); *G02F 1/133526*
   (2013.01); *G02F 1/133618* (2021.01); ***G02F
   1/134345*** (2021.01); *G02F 1/133514*
   (2013.01); *G02F 1/133617* (2013.01); *G02F
   2201/08* (2013.01)

(58) Field of Classification Search
   CPC ........... G02F 1/13394; G02F 1/133526; G02F
   1/133512; G02B 27/2214; G02B 3/005;
   H04N 13/0404
   See application file for complete search history.

(56) References Cited

U.S. PATENT DOCUMENTS

2012/0113360 A1* 5/2012 Lee .................. G02F 1/133512
                                                        349/86
2018/0088434 A1* 3/2018 Liang .................... G02F 1/1677
2021/0088853 A1* 3/2021 Zhu ........................ C09K 11/06

FOREIGN PATENT DOCUMENTS

| | | |
|---|---|---|
| CN | 106292120 A | 1/2017 |
| CN | 106324868 A | 1/2017 |
| CN | 206515585 U | 9/2017 |
| CN | 108919560 A | 11/2018 |
| CN | 109031752 A | 12/2018 |
| CN | 109031758 A | 12/2018 |
| CN | 110262119 A | 9/2019 |
| CN | 110419264 A | 11/2019 |
| CN | 110646989 A | 1/2020 |
| CN | 110888270 A | 3/2020 |
| CN | 112596311 A * | 4/2021 |
| CN | 112596311 A | 4/2021 |
| JP | H08248414 A | 9/1996 |
| JP | H0915550 A | 1/1997 |
| JP | 2008003401 A | 1/2008 |
| KR | 20170014755 A | 2/2017 |
| WO | 2016189815 A1 | 12/2016 |
| WO | 2019071267 A1 | 4/2019 |

* cited by examiner

DISPLAY PANEL AND DISPLAY DEVICE

RELATED APPLICATIONS

This application is a Notional Phase of PCT Patent Application No. PCT/CN2021/097519 having international filing date of May 31, 2021, which claims the benefit of priority of Chinese Patent Application No. 202110559351.6 filed on May 21, 2021. The contents of the above applications are all incorporated by reference as if fully set forth herein in their entirety.

BACKGROUND OF INVENTION

1. Field of Invention

The present application relates to a technical field of displays, and particularly to a display panel and a display device.

2. Related Art

Reflective displays made by the diffuse reflection principle do not require backlights, which reduce damage to the eyes caused by light sources. However, the reflective displays have a strong dependence on ambient light, and contrast when displaying a white state and a black state is poor. Therefore, display quality needs to be improved.

SUMMARY OF INVENTION

The embodiments of the present application provide a display panel and a display device to remedy a problem of poor contrast of the display panel in a white state and a black state when relying on reflection of external ambient light for displaying.

The present application provides a display panel having a display side, and the display panel comprising a liquid crystal layer, a light adjustment layer, and a reflection layer. The liquid crystal layer includes a plurality of liquid crystal molecules. The light adjustment layer includes a plurality of light adjustment portions. Each of the light adjustment portions comprises a contact interface facing corresponding part of the liquid crystal molecules. The reflection layer is disposed on a side of the liquid crystal layer and the light adjustment layer away from the display side and corresponding to the light adjustment portions. When one of a refractive index of the liquid crystal molecules and a refractive index of the light adjustment portions near the display side is greater than one of a refractive index of the liquid crystal molecules and a refractive index of the light adjustment portions away from the display side, the contact interface is for an incident light to be totally reflected on the contact interface; when one of the refractive index of the liquid crystal molecules and the refractive index of the light adjustment portions near the display side is less than one of the refractive index of the liquid crystal molecules and the refractive index of the light adjustment portions away from the display side, the contact interface allows the incident light to pass through.

Optionally, in some embodiments of the present application, a refractive index of the light adjustment layer is between an ordinary light refractive index and an extraordinary light refractive index of the liquid crystal molecules, the display panel further includes a plurality of first sub-electrodes and a second electrode, the first sub-electrodes and the second electrode are configured to apply a voltage so that there is a driving voltage difference between the first sub-electrodes and the second electrode, thereby driving the liquid crystal molecules to have the ordinary light refractive index or the extraordinary light refractive index.

Optionally, in some embodiments of the present application, the liquid crystal layer is disposed on a side of the light adjustment layer away from the display side or disposed on a side of the light adjustment layer near the display side.

Optionally, in some embodiments of the present application, the liquid crystal molecules are positive liquid crystal molecules, when the driving voltage difference is present between the first sub-electrodes and the second electrode, the liquid crystal molecules have the ordinary light refractive index, wherein the refractive index of the light adjustment layer is greater than the ordinary light refractive index; when the driving voltage difference is absent between the first sub-electrodes and the second electrode, the liquid crystal molecules have the extraordinary light refractive index, and the refractive index of the light adjustment layer is less than the extraordinary light refractive index of the liquid crystal molecules.

Optionally, in some embodiments of the present application, the liquid crystal molecules are negative liquid crystal molecules, and when the driving voltage difference is absent between the first sub-electrodes and the second electrode, the liquid crystal molecules have the ordinary light refractive index, and when the driving voltage difference is present between the first sub-electrodes and the second electrode, the liquid crystal molecules have the extraordinary light refractive index, wherein the refractive index of the light adjustment layer is less than the extraordinary light refractive index of the liquid crystal molecules.

Optionally, in some embodiments of the present application, a side of the light adjustment portions away from the liquid crystal layer comprises a second surface connecting to the contact interface, and a first included angle and a second included angle are defined between the contact interface and the second surface, respectively, wherein the first included angle is greater than an incident angle corresponding to totally reflected light at the contact interface from vertical incident light of the incident light, and the first included angle is equal to the second included angle.

Optionally, in some embodiments of the present application, the light adjustment portions protrude toward the liquid crystal layer, and the light adjustment portions are prisms or semi-cylinders.

Optionally, in some embodiments of the present application, the display panel further comprises a first substrate and a second substrate disposed opposite to each other, wherein the first substrate comprises the reflection layer, and the liquid crystal layer and the light adjustment layer are disposed between the first substrate and the second substrate, wherein the display panel further comprises a plurality of spacers disposed between the first substrate and the second substrate, each of the spacers is disposed between corresponding two of the light adjustment portions, and the spacers comprise a black material.

Optionally, in some embodiments of the present application, the reflection layer comprises a reflective light conversion layer comprising a plurality of reflective light-conversion portions corresponding to the light adjustment portions.

Optionally, in some embodiments of the present application, the reflection layer further comprises a reflective sheet located under the reflective light conversion layer.

Optionally, in some embodiments of the present application, the display panel further comprises a plurality of light absorption layers, wherein each of the light absorption layers comprises a plurality of reflective light-conversion portions corresponding to the light adjustment portions, and each of the light adjustment portions absorbs the incident light passing through the contact interface.

Optionally, in some embodiments of the present application, the display panel further comprises a pixel definition layer comprising a plurality of grooves, wherein each of the light absorption portions and each of the reflective light-conversion portions are located in a corresponding one of the grooves.

Optionally, in some embodiments of the present application, the pixel definition layer comprises a white photoresist material, each of the light absorption portions includes a black photoresist material, and each of the reflective light-conversion portions comprises a fluorescent material.

Optionally, in some embodiments of the present application, the refractive index of the light adjustment layer is greater than or equal to 1.6.

Accordingly, the embodiments of the present application also provide a device panel including the aforementioned display panels.

The present application has advantageous effects as follows: compared with prior art, the embodiments of the present application provide a display panel and a display device. The display panel includes a display side, a liquid crystal layer, a light adjustment layer, and a reflection layer. The liquid crystal layer includes a plurality of liquid crystal molecules. The light adjustment layer includes a plurality of light adjustment portions. Each of the light adjustment portions includes a contact interface facing corresponding part of the liquid crystal molecules. The reflection layer is disposed on a side of the liquid crystal layer and the light adjustment layer away from the display side and corresponding to the light adjustment portions. When one of a refractive index of the liquid crystal molecules and a refractive index of the light adjustment portions near the display side is greater than one of a refractive index of the liquid crystal molecules and a refractive index of the light adjustment portions away from the display side, the contact interface is for an incident light to be totally reflected thereon; when one of the refractive index of the liquid crystal molecules and the refractive index of the light adjustment portions near the display side is less than one of the refractive index of the liquid crystal molecules and the refractive index of the light adjustment portions away from the display side, the contact interface allows the incident light to pass through. By using the positional relationship between the light adjustment layer and the liquid crystal layer and refractive index relationship, the incident light is totally reflected at the contact interface or passed through the contact interface, and the incident light passing through the contact interface is reflected to the display side by the reflective layer so as to remedy the problem of poor contrast of the display panel, which is displayed relying on the reflection of external ambient light, in displaying the white state and the black state.

DESCRIPTION OF PREFERRED EMBODIMENTS

The technical solutions in the embodiments of the present application will be clearly and completely described below in conjunction with the accompanying drawings in the embodiments of the present application. It should be understood that the specific embodiments described here are only used to explain the present application, and are not used to limit the present application.

Specifically, referring to FIGS. 1A to 1E, which are schematic structural views of a display panel of one embodiment of the present application. The present application provides the display panel. The display panel includes a display side, a liquid crystal layer 101, a light adjustment layer 102, and a reflection layer. The liquid crystal layer 101 includes a plurality of liquid crystal molecules 1011. The light adjustment layer 102 includes a plurality of light adjustment portions 1021. Each of the light adjustment portions 1021 includes a contact interface 101a facing corresponding part of the liquid crystal molecule 1011. The reflection layer is disposed on a side of the liquid crystal layer 101 and the light adjustment layer 102 away from the display side, and the reflection layer corresponds to the light adjustment portions 1021. When a refractive index of the liquid crystal molecules 1011 and the light adjustment portions 1021 near the display side is greater than a refractive index of the liquid crystal molecules 1011 and the light adjustment portions 1021 away from the display side, the contact interface 101a is for incident light L to be totally reflected on the contact interface 101a. When the refractive index of the liquid crystal molecules 1011 and the light adjustment portions 1021 near the display side is less than the refractive index of the liquid crystal molecules 1011 and the light adjustment portions 1021 away from the display side, the contact interface 101a allows the incident light L to pass through. The incident light L, which enters an interior of the display panel, is reflected through the reflection layer to the display side, so as to remedy a problem of poor contrast of the display panel in a white state and a black state when relying on reflection of external ambient light for displaying.

Further, a refractive index nL of the light adjustment layer 102 is between an ordinary light refractive index no and an extraordinary light refractive index ne of the liquid crystal molecules 1011, so that the display panel can cooperate with the light adjustment layer 102 through the liquid crystal layer 101 to realize control of the incident light L. By controlling the incident light L that is totally reflected at the contact interfaces 101a of the liquid crystal molecules 1011 and the light adjustment portions 1021, or the incident light L that is transmitted through the liquid crystal layer 101 and the light adjustment layer 102, contrast of the display panel is improved.

The ordinary light refractive index no is a refractive index in a direction of a minor axis of the liquid crystal molecules 1011. The extraordinary light refractive index ne is a refractive index in a direction of a major axis of the liquid crystal molecules 1011. The display side is a side of the display panel for realizing displaying.

Optionally, the liquid crystal molecules 1011 are positive liquid crystal molecules and negative liquid crystal molecules. Further, the liquid crystal molecules 1011 are positive liquid crystal molecules and negative liquid crystal molecules. The incident light L includes ambient light.

Further, according to different materials of the liquid crystal molecules 1011, the refractive index nL of the light adjustment layer 102, the ordinary light refractive index no of the liquid crystal molecules 1011, and the extraordinary light refractive index ne of the liquid crystal molecules 1011 have different corresponding relationships.

Specifically, when the liquid crystal molecules 1011 are positive liquid crystal molecules, the ordinary light refractive index no of the liquid crystal molecules 1011 is less than the refractive index nL of the light adjustment layer 102, and the refractive index nL of the light adjustment layer 102 is less than the extraordinary light refractive index ne of the liquid crystal molecules 1011. That is, no<nL<ne.

Specifically, when the liquid crystal molecules 1011 are negative character liquid crystal molecules, the ordinary light refractive index no of the liquid crystal molecules 1011 is greater than the refractive index nL of the light adjustment layer 102, and the refractive index nL of the light adjustment layer 102 is greater than the extraordinary light refractive index ne of the liquid crystal molecules 1011. That is, ne<nL<no.

Optionally, the light adjustment layer 102 is made of transparent photoresist or glass. Further, the refractive index of the light adjustment layer 102 is greater than or equal to 1.6.

Figure 1A:
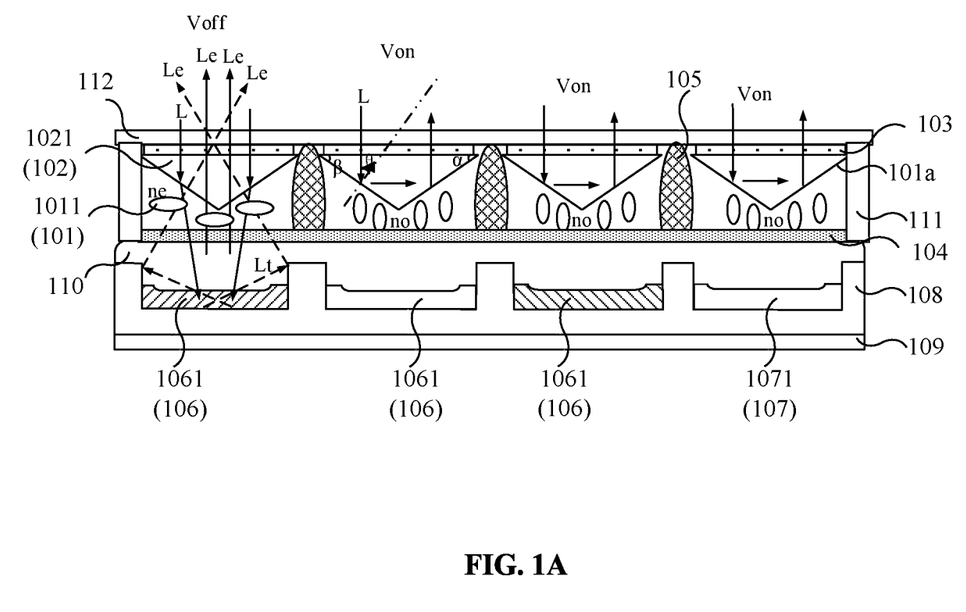
FIGS. 1A to 1E are schematic structural views of a display panel provided in one embodiment of the present application.
Figure 1B:
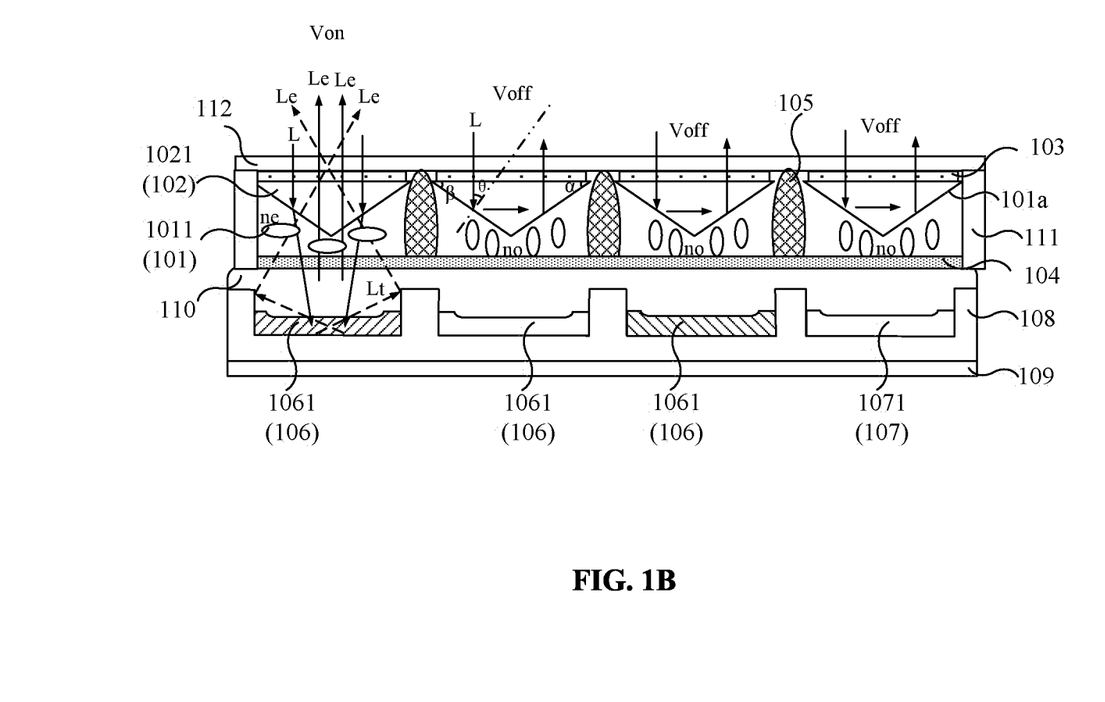

Still referring to FIGS. 1A and 1B, a side of the light adjustment portion 1021 away from the liquid crystal layer 101 has a second surface connecting to the contact interface 101a. A first included angle α and a second included angle β are formed between the contact interface 101a and the second surface, respectively. The first included angle α is greater than a corresponding incident angle θ of the incident light L totally reflected at the contact interfaces 101a (i.e., the first included angle α is greater than a critical angle C, wherein C=arcsin (a refractive index of the liquid crystal molecules/a refractive index of the light adjustment portions) or C=arcsin (a refractive index of the light adjustment portions/a refractive index of the liquid crystal molecules)). The first included angle α is equal to the second included angle β, so as to optimize utilization of light when the incident light L is the ambient light.

Optionally, the light adjustment portions 1021 protrudes toward the liquid crystal layer 101. The light adjustment portions 1021 are prisms or semi-cylinders as shown in FIGS. 1A to 1E. In addition, the contact interfaces 101a can also be flat surfaces parallel to surfaces of the display panel.

Still referring to FIGS. 1A to 1E, the display panel further includes a first electrode 103 and a second electrode 104. The first electrode 103 includes a plurality of first sub-electrodes. The first sub-electrodes and the second electrode 104 are configured to apply a voltage so that there is a voltage difference between the first sub-electrodes and the second electrode 104, thereby driving the liquid crystal molecules 1011 to have the ordinary light refractive index no or the extraordinary light refractive index ne.

Optionally, the first electrode 103 and the second electrode 104 are disposed opposite to each other as shown in FIGS. 1A to 1E. The first electrode 103 and the second electrode 104 can also be disposed on a same side, and descriptions of an arrangement of the first electrode 103 and the second electrode 104 are not repeated here. The first electrode 103 includes one of a pixel electrode or a common electrode. The second electrode 104 includes another one of the pixel electrode or the common electrode. Optionally, the common electrode may adopt a design of a planar electrode or a patterned electrode, and the pixel electrode adopts a design of a patterned electrode, so that the display panel can realize a partition control of the liquid crystal molecules 1011.

Still referring to FIGS. 1A to 1E, the liquid crystal layer 101 is disposed on a side of the light adjustment layer 102 away from the display side, or the liquid crystal layer 101 is disposed on a side of the light adjustment layer 102 near the display side.

Figure 1C:
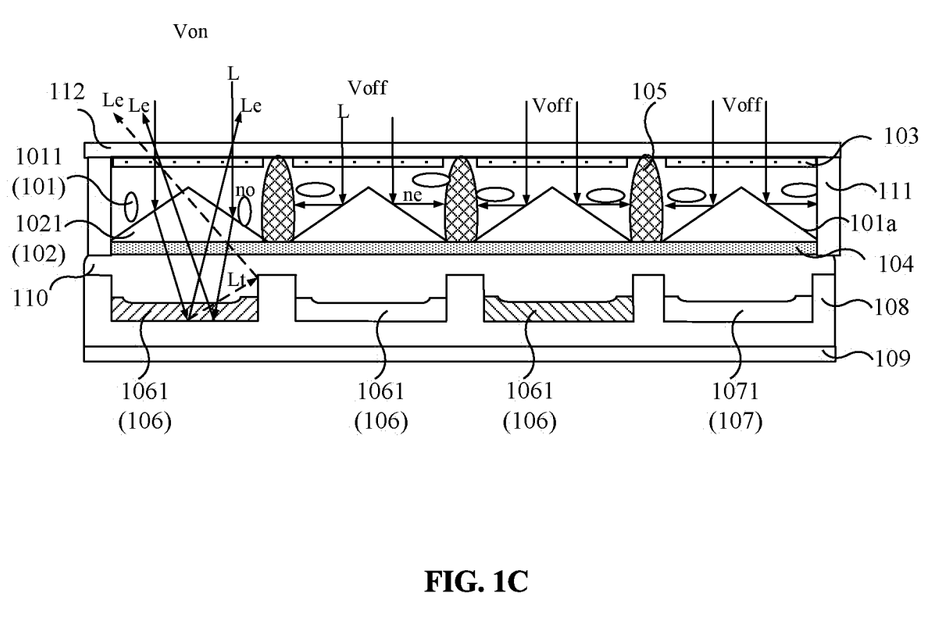
Figure 1D:
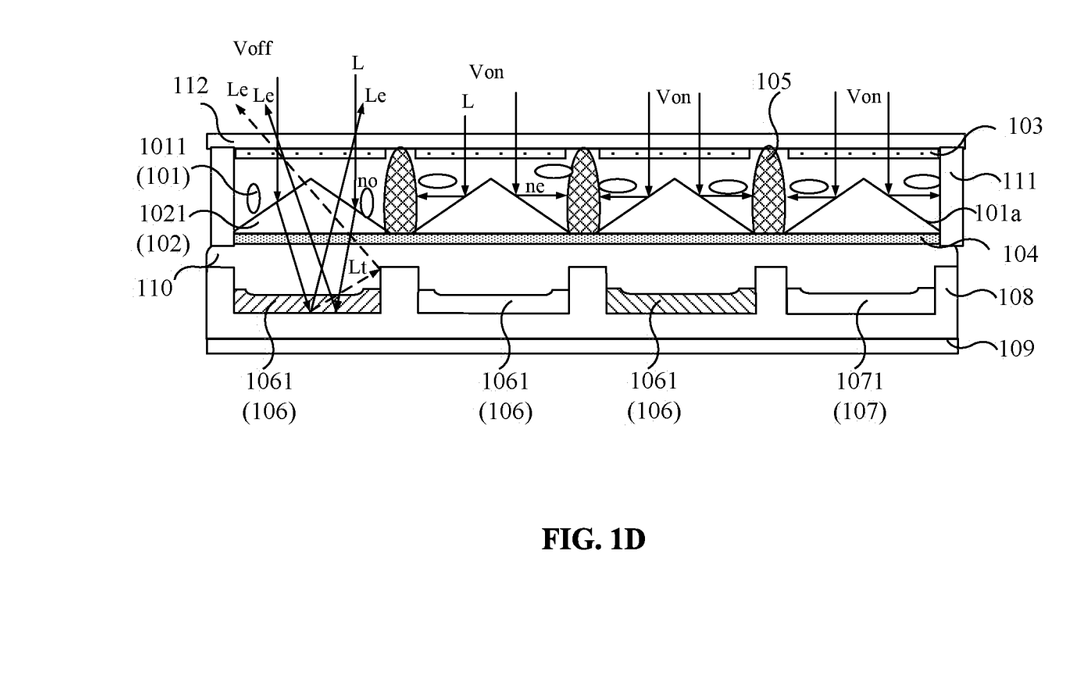
Figure 1E:
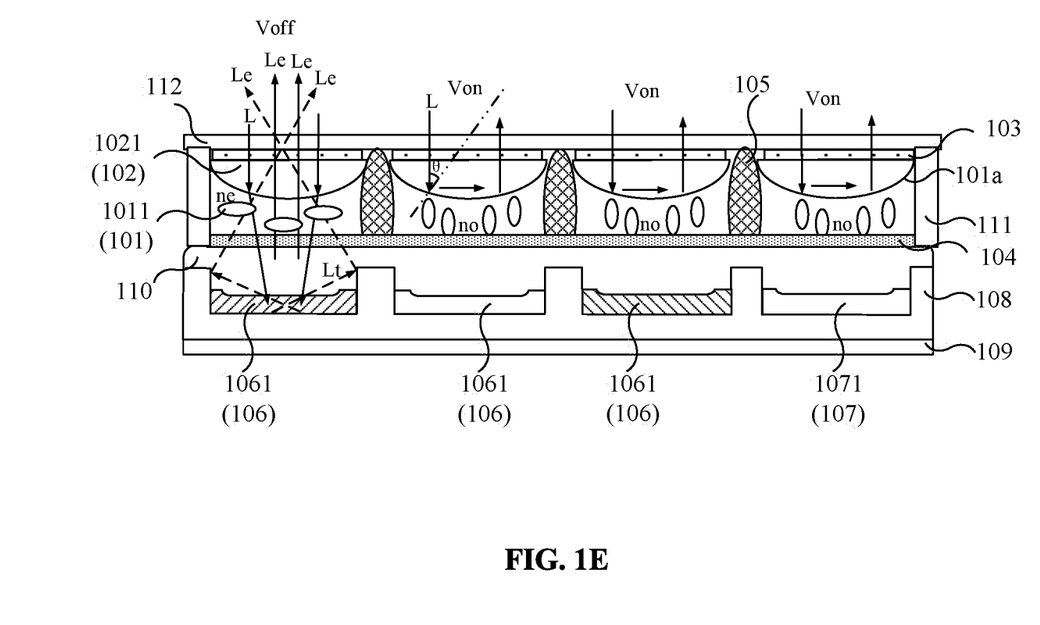

Specifically, the light adjustment layer 102 is disposed near the first electrode 103. The liquid crystal layer 101 is disposed between the second electrode 104 and the light adjustment layer 102 as shown in FIGS. 1A, 1B, and 1E. Specifically, the light adjustment layer 102 is disposed near the second electrode 104. The liquid crystal layer 101 is disposed between the first electrode 103 and the light adjustment layer 102 as shown in FIGS. 1C and 1D.

Figure 2:
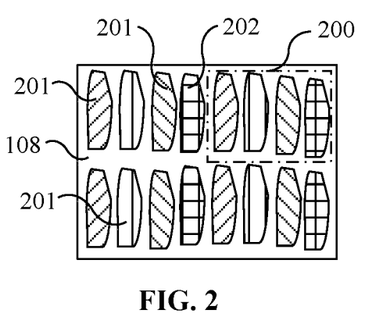
FIG. 2 is a schematic structural view of a pixel provided in one embodiment of the present application.
Figure 3:
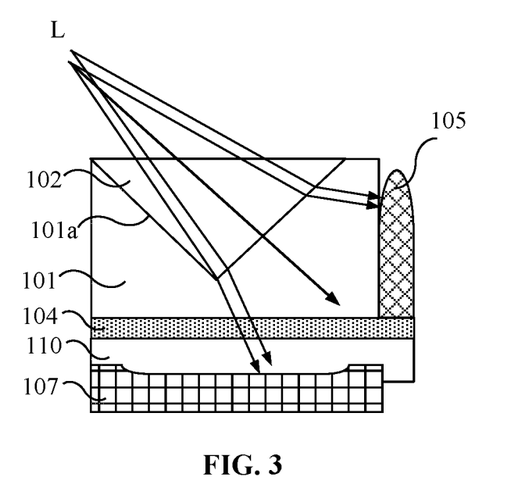
FIG. 3 is a schematic structural view of a light absorption portion and a spacer in a state of light absorption provided in one embodiment of the present application.

As shown in FIG. 2, it is a schematic structural view of a pixel provided in one embodiment of the present application. As shown in FIG. 3, it is a schematic structural view of a light absorption portion and a spacer in a state of light absorption provided in one embodiment of the present application. The display panel includes a plurality of pixels 200. Further, each of the pixels 200 includes a plurality of subpixels. The first sub-electrodes have a one-to-one correspondence with the subpixels. Optionally, the subpixels include a plurality of light-emitting subpixels 201 and a plurality of light-absorbing subpixels 202. The light-emitting subpixels 201 are used for emitting light according to the incident light L, and the light-absorbing subpixels 202 are used for absorbing the incident light L.

Each of the pixels 200 can obtain a white displaying effect through cooperation of the light-emitting subpixels that emit a red light, a green light, and a blue light. Optionally, the light-emitting subpixels 201 in one of the pixels 200 may include a first subpixel, a second subpixel, and a third subpixel whose light-emitting colors are red, green, and blue, respectively.

Still referring to FIGS. 1A to 1E and FIGS. 2 and 3, the display panel further includes a plurality of spacers 105. Each of the spacers 105 is disposed between the two corresponding light adjustment portions 1021, so that each of the spacers 105 is disposed between adjacent ones of the subpixels. The spacers 105 are configured to absorb the incident light L to prevent an incident interference from occurring between the adjacent ones of the subpixels when the incident light L enters the display panel, so that occurrence of cross-color between the adjacent ones of the subpixels can be prevented. In this manner, it is beneficial to improve the contrast of the display panel. Further, the spacers 105 include a black material.

The reflection layer includes a reflective light conversion layer 106. The reflective light conversion layer 106 includes a plurality of reflective light-conversion portions 1061. The reflective light-conversion portions 1061 and the light adjustment portions 1021 are corresponding to each other. Each of the reflective light-conversion portions 1061 converts the incident light L passing through the contact interface 101a into an emergent light Le. Further, the light-emitting subpixels 201 include the reflective light-conversion portions 1061. Optionally, each of the reflective light-conversion portions 1061 includes a fluorescent material, a quantum dot material, or a perovskite material, etc. A wavelength of the emergent light Le is equal to a wavelength of the incident light L, or the wavelength of the emergent light Le is greater than or less than the wavelength of the incident light L.

Further, the display panel further includes a plurality of light absorption layers 107 near the reflective light conversion layer 106. Each of the light absorption layers 107 includes a plurality of light absorption portions 1071. The light absorption portions 1071 and the light adjustment portions 1021 are corresponding to each other. Each of the light absorption portions 1071 absorbs the incident light L passing through the contact interface 101*a* to improve the contrast of the display panel. Further, the light-absorbing subpixels 202 include the light absorption portions 1071. Optionally, each of the light absorption portions 1071 includes a black photoresist material.

Optionally, number of the reflective light-conversion portions 1061 is greater than or equal to number of the light absorption portions 1071, so that the display panel has a higher contrast. A shape and an arrangement of the reflective light-conversion portions 1061 and the light absorption portions 1071 can be designed according to actual requirements, and descriptions thereof are not repeated herein.

Still referring to FIGS. 1A to 1E and FIG. 2, the display panel further includes a pixel definition layer 108. The pixel definition layer 108 includes a plurality of grooves. Each of the light absorption portions 1071 and each of the reflective light-conversion portions 1061 are located in the corresponding groove to increase reflection of the incident light L in the display panel. That is, the incident light L is converted in the display panel by the reflective light-conversion unit 1061, so that conversion light Lt is obtained. The conversion light Lt is reflected by the pixel definition layer 108 to form the emergent light Le. Optionally, reflectivity of the pixel definition layer 108 to the incident light L in the display panel is greater than 70%. Optionally, the pixel definition layer 108 is made of a white photoresist material. Further, the pixel definition layer 108 includes a transparent photoresist material and titanium dioxide. Optionally, the transparent photoresist material includes a photoresist.

Further, the reflection layer includes a reflective sheet 109. The reflective sheet 109 is disposed under the reflective light conversion layer 106 and the light absorption layers 107. The reflective sheet 109 can increase the reflection of the incident light L entering the display panel and increase the emergent light Le, which is beneficial to enhance a displaying effect of the display panel. Optionally, the reflective sheet 109 is made of silver, aluminum, gold, copper, or the like.

The display panel further includes a planarization layer 110, a sealant 111, a first substrate, and a second substrate 112. The second substrate 112 and the first substrate are disposed opposite to each other. The first substrate includes the reflection layer and a base. The liquid crystal layer 101, the light adjustment layer 102, and the spacers 105 are disposed between the first substrate and the second substrate 112. The base is disposed between the pixel definition layer 108 and the reflective sheet 109. The planarization layer 110 is disposed on the reflective light conversion layer 106, the light absorption layers 107, and the pixel definition layer 108. The sealant 111 is disposed outside the liquid crystal layer 101.

Still referring to FIGS. 1A to 1E, an illustration is described by using the positive character liquid crystal molecules as the liquid crystal molecules 1011. The positive character liquid crystal molecules include the positive liquid crystal molecules and the negative liquid crystal molecules. When the liquid crystal molecules 1011 are the positive character liquid crystal molecules, the extraordinary light refractive index ne of the liquid crystal molecules 1011 is greater than the ordinary light refractive index no of the liquid crystal molecules 1011, i.e., ne>no. Therefore, when the refractive index nL of the light adjustment layer 102 is between the ordinary light refractive index no of the liquid crystal molecules 1011 and the extraordinary light refractive index ne, the refractive index nL of the light adjustment layer 102 is greater than the ordinary light refractive index no of the liquid crystal molecules 1011 and is less than the extraordinary light refractive index ne of the liquid crystal molecules 1011, i.e., no<nL<ne.

When voltages are applied to the first sub-electrodes and the second electrode 104, respectively, the major axis of the liquid crystal molecules 1011 rotates in a direction parallel to electric field lines if the liquid crystal molecules 1011 are the positive liquid crystal molecules; the major axis of the liquid crystal molecules 1011 rotates in a direction perpendicular to the electric field lines if the liquid crystal molecules 1011 are the negative liquid crystal molecules.

In the following, a working principle of the display panel will be described accompanying with a positional relationship of the liquid crystal layer 101 and the light adjustment layer 102, a material of the liquid crystal molecules 1011, presence or absence of an electric filed between the first sub-electrodes and the second electrode 104, and corresponding refractive indexes of the liquid crystal molecules 1011 in different situations (the positional relationship of the liquid crystal layer 101 and the light adjustment layer 102, and the presence or the absence of the electric filed between the first sub-electrodes and the second electrode 104).

Still referring to FIGS. 1A and 1E, the illustration is described by using the positive liquid crystal molecules and the positive character liquid crystal molecules as the liquid crystal molecules 1011.

When the voltages are applied to the first sub-electrodes and the second electrode 104, respectively, an electric field with a driving voltage difference is formed between the first sub-electrodes and the second electrode 104. The major axis of the liquid crystal molecules 1011 deflects in a direction parallel to the electric field, and the liquid crystal molecules 1011 have the ordinary light refractive index no. Since the refractive index nL of the light adjustment layer 102 is greater than the ordinary light refractive index no of the liquid crystal molecules 1011 (i.e., nL>no), the refraction angle of a refracted light L1 will be greater than the incident angle θ when the incident light L enters the liquid crystal layer 101 with a lower refractive index from the light adjustment layer 102 with a higher refractive index, and as the incident angle θ increases, the refraction angle will first increase to 90°, at this time the incident light L is totally reflected at the contact interface 101*a*. The incident angle corresponding to the refraction angle of 90° is the critical angle C1, where C1=arcsin(no/nL). When the ordinary light refractive index no of the liquid crystal molecules 1011 is 1.6 and the refractive index nL of the light adjustment layer 102 is 1.8, the incident angle θ>62°.

When there is no electric field between the first electrode 103 and the second electrode 104 so that there is no driving voltage difference, the liquid crystal molecules 1011 are in an initial state, and at this time, the liquid crystal molecules 1011 have the extraordinary light refractive index ne. Since the refractive index nL of the light adjustment layer 102 is less than the extraordinary light refractive index ne of the liquid crystal molecules 1011 (i.e., nL<ne), the incident light L passes through the contact interface 101*a* and enters the interior of the display panel when the incident light L enters the liquid crystal layer 101 with a higher refractive index from the light adjustment layer 102 with a lower refractive index.

Still referring FIGS. 1A, 1E, and 2, when the pixels 200 achieve the white displaying effect, light-emitting sub-pixels 201 are not working, and light-absorbing sub-pixels 202 are working. That is, there is no electric field between first sub-electrodes corresponding to the light-emitting sub-pixels 201 and the second electrode 104 so that there is no driving voltage difference. The incident light L enters the display panel, and the reflective light-conversion portions 1061 convert the incident light L into the emergent light Le. An electric field with the driving voltage difference is formed between first sub-electrodes corresponding to the light-absorbing sub-pixels 202 and the second electrode 104, and the incident light L is totally reflected at the contact interface 101a. Alternatively, when the pixels 200 achieve the white displaying effect, the light-emitting sub-pixels 201 and the light-absorbing sub-pixels 202 both are working. That is, the electric fields with the driving voltage difference are formed between the first sub-electrodes corresponding to the light-emitting sub-pixels 201 and the second electrode 104 and between the first sub-electrodes corresponding to the light-absorbing sub-pixels 202 and the second electrode 104, and the incident light L is totally reflected at the contact interface 101a.

In aforementioned two ways the pixels 200 achieve the white displaying effect, a mean that the light-emitting sub-pixels 201 and the light-absorbing subpixels 202 both are working has advantages of a low light energy loss and a high brightness in the white state comparing to a mean that the light-emitting sub-pixels 201 are not working and the light-absorbing subpixels 202 are working.

When one of the pixels 200 achieves a monochrome displaying effect, some of the light-emitting sub-pixels 201 in the pixel 200 are not working, and some of the light-emitting sub-pixels 201 and the light-absorbing sub-pixels 202 are working. Specifically, the monochrome displaying effect includes displaying red, green, blue, and the like. The light-emitting subpixels 201 in one of the pixels 200 may include a first subpixel, a second subpixel, and a third subpixel with different light-emitting colors. Using one of the pixels 200 achieving a red displaying effect and a light-emitting color of the first subpixel is red as an example, there is no electric field between the first sub-electrodes corresponding to the first subpixel and the second electrode 104 so that there is no driving voltage difference. The incident light L enters the display panel, and the reflective light-conversion portions 1061 convert the incident light L into the emergent light Le. The electric fields with the driving voltage difference are formed between the first sub-electrodes corresponding to the second subpixel, the third subpixel, and the light-absorbing subpixels 202 and the second electrode 104, and the incident light L is totally reflected at the contact interface 101a. Similarly, in situations that the pixel 200 achieves displaying in green, blue, or the like can also be obtained, and descriptions thereof are not repeated herein.

Still referring to FIG. 1B, the illustration is described by using the negative liquid crystal molecules and the positive character liquid crystal molecules as the liquid crystal molecules 1011.

When there is no electric field between the first sub-electrodes and the second electrode 104 so that there is no driving voltage difference, the liquid crystal molecules 1011 are in the initial state, and the liquid crystal molecules 1011 have the ordinary light refractive index no. Since the refractive index nL of the light adjustment layer 102 is greater than the ordinary light refractive index no of the liquid crystal molecules 1011 (i.e., nL>no), the incident light L is totally reflected at the contact interface 101a when the incident light L enters the liquid crystal layer 101 with a lower refractive index from the light adjustment layer 102 with a higher refractive index and the incident angle θ of the incident light L is greater than the critical angle C1.

When the voltages are applied to the first sub-electrodes and the second electrode 104, respectively, the electric field with the driving voltage difference is formed between the first sub-electrodes and the second electrode 104. The major axis of the liquid crystal molecules 1011 is perpendicular to a direction of the electric field, and the liquid crystal molecules 1011 have the extraordinary light refractive index ne. Since the refractive index nL of the light adjustment layer 102 is less than the extraordinary light refractive index ne of the liquid crystal molecules 1011 (i.e., nL<ne), the incident light L passes through the contact interface 101a and enters the interior of the display panel when the incident light L enters the liquid crystal layer 101 with a higher refractive index from the light adjustment layer 102 with a lower refractive index.

Still referring to FIGS. 1B and 2, when the pixels 200 achieve the white displaying effect, the light-emitting sub-pixels 201 in one of the pixels 200 are working, and the light-absorbing subpixels 202 are not working. That is, the electric field with the driving voltage difference is formed between the first sub-electrodes corresponding to the light-emitting subpixels 201 and the second electrode 104, the incident light L enters the display panel, and the reflective light-conversion portions 1061 convert the incident light L into the emergent light Le. There is no electric field between the first sub-electrodes corresponding to the light-absorbing subpixels 202 and the second electrode 104 so that there is no driving voltage difference, and the incident light L is totally reflected at the contact interface 101a.

Alternatively, when the pixels 200 achieve the white displaying effect, the light-emitting subpixels 201 and the light-absorbing subpixels 202 in one of the pixels 200 are not working. That is, there is no electric field between the first sub-electrodes corresponding to the light-emitting sub-pixels 201 and the second electrode 104 so that there is no driving voltage difference and there is no electric field between the first sub-electrodes corresponding to the light-absorbing subpixels 202 and the second electrode 104 so that there is no driving voltage difference, and the incident light L is totally reflected at the contact interface 101a.

In the aforementioned two ways the pixels 200 achieve the white displaying effect, a mean that the light-emitting subpixels 201 and the light-absorbing subpixels 202 both are not working has the advantages of the low light energy loss and the high brightness in the white state comparing to a mean that the light-emitting subpixels 201 are working and the light-absorbing subpixels 202 are not working.

When one of the pixels 200 achieves the monochrome displaying effect, some of the light-emitting subpixels 201 in the pixel 200 are working, and some of the light-emitting subpixels 201 and the light-absorbing subpixels 202 are not working. Specifically, the monochrome displaying effect includes displaying red, green, blue, and the like. The light-emitting subpixels 201 in one of the pixels 200 may include the first subpixel, the second subpixel, and the third subpixel with different light-emitting colors. Using one of the pixels 200 achieving the red displaying effect and the light-emitting color of the first subpixel is red as the example, the electric field with driving voltage difference is formed between the first sub-electrodes corresponding to the first subpixel and the second electrode 104, the incident light L enters the display panel, and the reflective light-conversion portions 1061 convert the incident light L into the emergent light Le. There is no electric fields between the first sub-electrodes corresponding to the second subpixel, the third subpixel, and the light-absorbing subpixels 202 and the second electrode 104, so that there is no driving voltage difference, and the incident light L is totally reflected at the contact interface 101a. Similarly, in the situations that the pixel 200 achieves displaying in green, blue, or the like can also be obtained, and descriptions thereof are not repeated herein.

Still referring to FIG. 1C, the illustration is described by using the positive liquid crystal molecules and the positive character liquid crystal molecules as the liquid crystal molecules 1011.

When there is no electric field between the first sub-electrodes and the second electrode 104 so that there is no driving voltage difference, the liquid crystal molecules 1011 are in the initial state, and at this time, the liquid crystal molecules 1011 have the extraordinary light refractive index ne. Since the refractive index nL of the light adjustment layer 102 is less than the extraordinary light refractive index ne of the liquid crystal molecules 1011 (i.e., nL<ne), the incident light L is totally reflected at the contact interface 101a when the incident light L enters the light adjustment layer 102 with the lower refractive index from the liquid crystal layer 101 with the higher refractive index and the incident angle θ of the incident light L is greater than a critical angle C2, wherein C2=arcsin(nL/ne).

When the voltages are applied to the first sub-electrodes and the second electrode 104, respectively, the electric field with the driving voltage difference is formed between the first sub-electrodes and the second electrode 104, the major axis of the liquid crystal molecules 1011 deflects in the direction parallel to the electric field, and the liquid crystal molecules 1011 have the ordinary light refractive index no. Since the refractive index nL of the light adjustment layer 102 is greater than the ordinary light refractive index no of the liquid crystal molecules 1011 (i.e., nL>no), the incident light L passes through the contact interface 101a and enters the interior of the display panel when the incident light L enters the light adjustment layer 102 with the higher refractive index from the liquid crystal layer 101 with the lower refractive index.

Still referring FIGS. 1C and 2, when the pixels 200 achieve the white displaying effect, the light-emitting subpixels 201 and the light-absorbing subpixels 202 in one of the pixels 200 are working. That is, the electric field with the driving voltage difference is formed between the first sub-electrodes corresponding to the light-emitting subpixels 201 and the second electrode 104, the incident light L enters the display panel, and the reflective light-conversion portions 1061 convert the incident light L into the emergent light Le. The electric field with the driving voltage difference is formed between the first sub-electrodes corresponding to the light-absorbing subpixels 202 and the second electrode 104, and the incident light L is absorbed by the light absorption portions 1071.

When one of the pixels 200 achieves a monochrome displaying effect, some of the light-emitting subpixels 201 in the pixel 200 are working, and some of the light-emitting subpixels 201 and the light-absorbing subpixels 202 are not working. Specifically, the monochrome displaying effect includes displaying red, green, blue, and the like. The light-emitting subpixels 201 in one of the pixels 200 may include the first subpixel, the second subpixel, and the third subpixel with different light-emitting colors. Using one of the pixels 200 achieving the red displaying effect and the light-emitting color of the first subpixel is red as the example, the electric field with driving voltage difference is formed between the first sub-electrodes corresponding to the first subpixel and the second electrode 104, the incident light L enters the display panel, and the reflective light-conversion portions 1061 convert the incident light L into the emergent light Le. There is no electric fields between the first sub-electrodes corresponding to the second subpixel, the third subpixel, and the light-absorbing subpixels 202 and the second electrode 104, so that there is no driving voltage difference, and the incident light L is totally reflected at the contact interface 101a. Similarly, in the situations that the pixel 200 achieves displaying in green, blue, or the like can also be obtained, and descriptions thereof are not repeated herein.

Still referring to FIG. 1D, the illustration is described by using the negative liquid crystal molecules and the positive character liquid crystal molecules as the liquid crystal molecules 1011.

When the voltages are applied to the first sub-electrodes and the second electrode 104, respectively, the electric field with the driving voltage difference is formed between the first sub-electrodes and the second electrode 104, the major axis of the liquid crystal molecules 1011 is perpendicular to the direction of the electric filed, and the liquid crystal molecules 1011 have the extraordinary light refractive index ne. Since the refractive index nL of the light adjustment layer 102 is less than the extraordinary light refractive index ne of the liquid crystal molecules 1011 (i.e., nL<ne), the incident light L is totally reflected at the contact interface 101a when the incident light L enters the light adjustment layer 102 with the lower refractive index from the liquid crystal layer 101 with the higher refractive index and the incident angle θ of the incident light L is greater than the critical angle C2.

When there is no electric field between the first sub-electrodes and the second electrode 104 so that there is no driving voltage difference, the liquid crystal molecules 1011 are in the initial state, and the liquid crystal molecules 1011 have the ordinary light refractive index no. Since the refractive index nL of the light adjustment layer 102 is greater than the ordinary light refractive index no of the liquid crystal molecules 1011 (i.e., nL>no), the incident light L passes through the contact interface 101a and enters the interior of the display panel when the incident light L enters the light adjustment layer 102 with the higher refractive index from the liquid crystal layer 101 with the lower refractive index.

Still referring FIGS. 1D and 2, when the pixels 200 achieve the white displaying effect, the light-emitting subpixels 201 and the light-absorbing subpixels 202 in one of the pixels 200 are not working. That is, there is no electric field between the first sub-electrodes corresponding to the light-emitting subpixels 201 and the second electrode 104 so that there is no driving voltage difference. The incident light L enters the display panel, and the reflective light-conversion portions 1061 convert the incident light L into the emergent light Le. There is no electric field between the first sub-electrodes corresponding to the light-absorbing subpixels 202 and the second electrode 104 so that there is no driving voltage difference, and the incident light L is absorbed by the light absorption portions 1071.

When one of the pixels 200 achieves a monochrome displaying effect, some of the light-emitting subpixels 201 in the pixel 200 are not working, and some of the light-emitting subpixels 201 and the light-absorbing subpixels 202 are working. Specifically, the monochrome displaying effect includes displaying red, green, blue, and the like. The light-emitting subpixels 201 in one of the pixels 200 may include the first subpixel, the second subpixel, and the third subpixel with different light-emitting colors. Using one of the pixels 200 achieving a red displaying effect and the light-emitting color of the first subpixel is red as the example, there is no electric field between the first sub-electrodes corresponding to the first subpixel and the second electrode 104 so that there is no driving voltage difference. The incident light L enters the display panel, and the reflective light-conversion portions 1061 convert the incident light L into the emergent light Le. The electric fields with the driving voltage difference are formed between the first sub-electrodes corresponding to the second subpixel, the third subpixel, and the light-absorbing subpixels 202 and the second electrode 104, and the incident light L is totally reflected at the contact interface 101a. Similarly, in the situations that the pixel 200 achieves displaying in green, blue, or the like can also be obtained, and descriptions thereof are not repeated herein.

In the display panels shown in FIGS. 1A to 1E, working states of the light-emitting subpixels 201 and the light-absorbing subpixels 202 in one of the pixels 200 achieving a black displaying effect are opposite to working states of the light-emitting subpixels 201 and the light-absorbing subpixels 202 in one of the pixels 200 achieving the white displaying effect, and descriptions of the working states are not repeated here.

In the display panels shown in FIGS. 1A to 1E, Von refers to applying a voltage to the first sub-electrodes and the second electrode 104 to form an electric field with driving voltage difference between the first sub-electrodes and the second electrode 104. Voff refers to that there is no electric field between the first sub-electrodes and the second electrode 104 so that there is no driving voltage difference. The electric field formed between the first sub-electrodes and the second electrode 104 in a one-to-one correspondence can control a deflection of the liquid crystal molecules 1011 so that the liquid crystal molecules 1011 can have different refractive indexes under different voltage conditions. Therefore, the liquid crystal layer 101 can cooperate with the light adjustment layer 102 to realize controlling that the incident light L is totally reflected, or the incident light L is transmitted through the liquid crystal layer 101 and the light adjustment layer 102 and enters the interior of the display panel. As a result, the contrast of the display panel is improved.

Similarly, when the liquid crystal molecules 1011 are negative character liquid crystal molecules including positive liquid crystal molecules and negative liquid crystal molecules, the working principle of the display panel when the liquid crystal molecules 1011 adopts the negative character liquid crystal molecules is similar to the working principle of the display panel when the liquid crystal molecules 1011 adopt the positive character liquid crystal molecules, and descriptions of the working principles are not repeated here.

Still refer to FIGS. 1A to 1E. In the display panel shown in FIGS. 1A, 1B, and 1E, the display panel realizes a black state adjustment through the light-absorbing subpixels 202, and realizes a white state adjustment through the emergent light Le converted by the reflective light-conversion portions 1061 in the light-emitting subpixels 201 and a totally reflected light from the incident light L at the contact interface 101a. In the display panel shown in FIGS. 1C and 1D, the display panel realizes the black state adjustment through the totally reflected light from the incident light L at the contact interface 101a. The totally reflected light can be absorbed by the spacers 105 to obtain a better dark state. The display panel realizes the white state adjustment through the emergent light Le converted by the reflective light-conversion portions 1061 in the light-emitting subpixels 201 and light absorbed by the light-absorbing subpixels 202.

It should be understood that the display panel further includes a polarizer, touch electrodes, or other parts which are not shown. A structural schematic view of the display panel when the light adjustment portions 1021 are semi-cylinders can refer to a design of the schematic structural view of the display panel when the light adjustment portions 1021 are prisms as in FIGS. 1A to 1D, and descriptions of the light adjustment portions 1021 are not repeated here.

The present application further provides a display device including any of aforementioned display panels.

Accordingly, although the present application has been disclosed as a preferred embodiment, it is not intended to limit the present application. Those skilled in the art without departing from the scope of the present application may make various changes or modifications, and thus the scope of the present application should be after the appended claims and their equivalents.

What is claimed is:

1. A display panel, having a display side, and the display panel comprising:
   a liquid crystal layer comprising a plurality of liquid crystal molecules;
   a light adjustment layer comprising a plurality of light adjustment portions, wherein each of the light adjustment portions comprises a contact interface facing corresponding part of the liquid crystal molecules; and
   a reflection layer disposed on a side of the liquid crystal layer and the light adjustment layer away from the display side, and corresponding to the light adjustment portions;
   wherein when one of a refractive index of the liquid crystal molecules and a refractive index of the light adjustment portions near the display side is greater than one of a refractive index of the liquid crystal molecules and a refractive index of the light adjustment portions away from the display side, the contact interface is for an incident light to be totally reflected on the contact interface, and when one of the refractive index of the liquid crystal molecules and the refractive index of the light adjustment portions near the display side is less than one of the refractive index of the liquid crystal molecules and the refractive index of the light adjustment portions away from the display side, the contact interface allows the incident light to pass through;
   wherein the reflection layer comprises a reflective light conversion layer comprising a plurality of reflective light-conversion portions corresponding to the light adjustment portions;
   wherein the display panel further comprises a plurality of light absorption layers near the reflective light conversion layer, wherein each of the light absorption layers comprises a plurality of light absorption portions corresponding to the light adjustment portions, and each of light absorption portions absorbs the incident light passing through the contact interface;
   wherein the display panel further comprises a pixel definition layer comprising a plurality of grooves, wherein each of the light absorption portions and each of the reflective light-conversion portions are located in a corresponding one of the grooves.

2. The display panel of claim 1, wherein the refractive index of the light adjustment layer is between an ordinary light refractive index and an extraordinary light refractive index of the liquid crystal molecules, the display panel further comprises a plurality of first sub-electrodes and a second electrode, the first sub-electrodes and the second electrode are configured to apply a voltage so that there is a driving voltage difference between the first sub-electrodes and the second electrode, thereby driving the liquid crystal molecules to have the ordinary light refractive index or the extraordinary light refractive index.

3. The display panel of claim 2, wherein the liquid crystal layer is disposed on a side of the light adjustment layer away from the display side or disposed on a side of the light adjustment layer near the display side.

4. The display panel of claim 3, wherein the liquid crystal molecules are positive liquid crystal molecules, and when the driving voltage difference is present between the first sub-electrodes and the second electrode, the liquid crystal molecules have the ordinary light refractive index, wherein the refractive index of the light adjustment layer is greater than the ordinary light refractive index, and when the driving voltage difference is absent between the first sub-electrodes and the second electrode, the liquid crystal molecules have the extraordinary light refractive index, wherein the refractive index of the light adjustment layer is less than the extraordinary light refractive index of the liquid crystal molecules.

5. The display panel of claim 3, wherein the liquid crystal molecules are negative liquid crystal molecules, and when the driving voltage difference is absent between the first sub-electrodes and the second electrode, the liquid crystal molecules have the ordinary light refractive index, wherein the refractive index of the light adjustment layer is greater than the ordinary light refractive index, and when the driving voltage difference is present between the first sub-electrodes and the second electrode, the liquid crystal molecules have the extraordinary light refractive index, wherein the refractive index of the light adjustment layer is less than the extraordinary light refractive index.

6. The display panel of claim 1, wherein a side of the light adjustment portions away from the liquid crystal layer comprises a second surface connecting to the contact interface, and a first included angle and a second included angle are defined between the contact interface and the second surface, respectively, wherein the first included angle is greater than an incident angle corresponding to a totally reflected light at the contact interface from a vertical incident light of the incident light, and the first included angle is equal to the second included angle.

7. The display panel of claim 6, wherein the light adjustment portions protrude toward the liquid crystal layer, and the light adjustment portions are prisms or semi-cylinders.

8. The display panel of claim 1, further comprising a first substrate and a second substrate disposed opposite to each other, wherein the first substrate comprises the reflection layer, and the liquid crystal layer and the light adjustment layer are disposed between the first substrate and the second substrate, wherein the display panel further comprises a plurality of spacers disposed between the first substrate and the second substrate, each of the spacers is disposed between corresponding two of the light adjustment portions, and the spacers comprise a black material.

9. The display panel of claim 1, wherein the reflection layer further comprises a reflective sheet located under the reflective light conversion layer.

10. The display panel of claim 1, wherein the pixel definition layer comprises a white photoresist material, each of the light absorption portions includes a black photoresist material, and each of the reflective light-conversion portions comprises a fluorescent material.

11. The display panel of claim 1, wherein a refractive index of the light adjustment layer is greater than or equal to 1.6.

12. A display device, comprising a display panel having a display side, wherein the display panel comprises:
    a liquid crystal layer comprising a plurality of liquid crystal molecules;
    a light adjustment layer comprising a plurality of light adjustment portions, wherein each of the light adjustment portions comprises a contact interface facing corresponding part of the liquid crystal molecules comprise a contact interface; and
    a reflection layer disposed on a side of the liquid crystal layer and the light adjustment layer away from the display side and corresponding to the light adjustment portions;
    wherein when one of a refractive index of the liquid crystal molecules and a refractive index of the light adjustment portions near the display side is greater than one of a refractive index of the liquid crystal molecules and a refractive index of the light adjustment portions away from the display side, the contact interface is for an incident light to be totally reflected on the contact interface, and when one of the refractive index of the liquid crystal molecules and the refractive index of the light adjustment portions near the display side is less than one of the refractive index of the liquid crystal molecules and the refractive index of the light adjustment portions away from the display side, the contact interface allows the incident light to pass through;
    wherein the reflection layer comprises a reflective light conversion layer and a reflective sheet located under the reflective light conversion layer, wherein the reflective light conversion layer comprises a plurality of reflective light-conversion portions corresponding to the light adjustment portions;
    wherein the display panel further comprises a pixel definition layer and a plurality of light absorption layers near the reflective light conversion layer, each of the light absorption layers comprises a plurality of light absorption portions corresponding to the light adjustment portions, each of light absorption portions absorbs the incident light passing through the contact interface, the pixel definition layer comprises a plurality of grooves, and each of the light absorption portions and each of the reflective light-conversion portions are located in a corresponding one of the grooves.

13. The display device of claim 12, wherein the refractive index of the light adjustment layer is between an ordinary light refractive index and an extraordinary light refractive index of the liquid crystal molecules, the display panel further comprises a plurality of first sub-electrodes and a second electrode, the first sub-electrodes and the second electrode are configured to apply a voltage so that there is a driving voltage difference between the first sub-electrodes and the second electrode, thereby driving the liquid crystal molecules to have the ordinary light refractive index or the extraordinary light refractive index.

14. The display device of claim 13, wherein the liquid crystal layer is disposed on a side of the light adjustment layer away from the display side or disposed on a side of the light adjustment layer near the display side.

15. The display device of claim 12, wherein the light adjustment portions protrude toward the liquid crystal layer, and the light adjustment portions are prisms or semi-cylinders.

* * * * *